United States Patent
Schmalzrieth

(10) Patent No.: US 10,689,034 B2
(45) Date of Patent: Jun. 23, 2020

(54) SUBFRAME FOR A MOTOR VEHICLE

(71) Applicant: AUDI AG, Ingolstadt (DE)

(72) Inventor: Sven Schmalzrieth, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 183 days.

(21) Appl. No.: 15/832,161

(22) Filed: Dec. 5, 2017

(65) Prior Publication Data

US 2018/0201322 A1    Jul. 19, 2018

(30) Foreign Application Priority Data

Jan. 19, 2017   (DE) .................. 10 2017 200 853

(51) Int. Cl.
| | | |
|---|---|---|
| *B62D 21/09* | (2006.01) | |
| *B62D 27/06* | (2006.01) | |
| *B62D 21/02* | (2006.01) | |
| *B62D 21/11* | (2006.01) | |

(52) U.S. Cl.
CPC ............. *B62D 21/09* (2013.01); *B62D 21/02* (2013.01); *B62D 21/11* (2013.01); *B62D 27/065* (2013.01)

(58) Field of Classification Search
CPC ........ B62D 21/09; B62D 21/02; B62D 21/11; B62D 27/065
USPC ......................................................... 296/204
See application file for complete search history.

(56) References Cited

U.S. PATENT DOCUMENTS

| | | | | |
|---|---|---|---|---|
| 4,453,740 A | * | 6/1984 | von der Ohe | B62D 21/11 180/311 |
| 2008/0265626 A1 | * | 10/2008 | Dorr | B62D 21/11 296/204 |
| 2015/0034409 A1 | * | 2/2015 | Leibl | B62D 21/11 180/312 |
| 2016/0075381 A1 | | 3/2016 | Keller | |

FOREIGN PATENT DOCUMENTS

| | | |
|---|---|---|
| DE | 102012020873 A1 | 4/2014 |
| DE | 102014102541 A1 | 8/2015 |
| DE | 102014214917 A1 | 2/2016 |
| DE | 102015013533 B3 | 9/2016 |
| DE | 102016000670 B3 | 1/2017 |

OTHER PUBLICATIONS

German Search Report dated Oct. 27, 2017 of corresponding German application No. 102017200853.9; 12 pgs.

* cited by examiner

*Primary Examiner* — Joseph D. Pape
(74) *Attorney, Agent, or Firm* — Maier & Maier, PLLC

(57) ABSTRACT

A subframe for a motor vehicle is provided with at least two structural elements extending in the longitudinal direction of the motor vehicle, and with at least one structural element extending in the transverse direction of the motor vehicle, a plurality of first bearing elements for connecting the subframe to a chassis of the motor vehicle, and at least two second bearing elements for connecting an assembly to the subframe. At least one of the first bearing elements and at least one of the second bearing elements are arranged at a common bearing console, which is attached to the at least one structural element extending in the transverse direction of the motor vehicle.

10 Claims, 3 Drawing Sheets

SUBFRAME FOR A MOTOR VEHICLE

FIELD

The invention relates to a subframe for a motor vehicle, which is provided with at least two structural elements extending in the longitudinal direction of the motor vehicle.

BACKGROUND

A generic subframe is known from DE 10 2015 013 533 B3.

DE 10 2012 029 873 A1 describes a subframe which is connected via a plurality of bearing receptacles on the chassis of the motor vehicle.

Similar subframes are also described in DE 10 2014 214 917 A1 and US 2016/0075381 A1.

The disadvantage of known subframes is the fact that they require a relatively high amount of space, which makes it difficult to accommodate systems such as the traction battery or power electronics in the adjacent area. The high space requirement is created by the construction indicated in prior art, wherein the subframe bearings are formed both in the longitudinal and in the transverse direction as space-limiting extreme points.

This is particularly disadvantageous in hybrid vehicles or electric vehicles because these vehicles require additional space in the area of the chassis, for example for an electric motor or for a battery.

SUMMARY

It is therefore an object of the present invention to provide a subframe for a motor vehicle which requires less space than known solutions.

By means of the bearing console according to the invention, on which at least one of the first bearing elements and at least one of the second bearing element is arranged and which is itself attached to the at least one structural element of the subframe extending in the transverse direction of the motor vehicle, a large amount of space can be saved because the bearing elements can be arranged in this manner in a more compact manner than with known solutions. The entire subframe according to the invention thus not only requires a much smaller size for installation, but its weight can be also reduced.

Due to the possible reduction of the installation size of the subframe, the installation space obtained in this manner can be used for other structural components or units of the motor vehicle, such as for example for batteries. It goes without saying that it is possible to use this installation space also in non-electrified motor vehicles, for example for a differential, or for similar structural components or units.

In a very advantageous further development, it can be provided that the at least one bearing console is releasably attached to the at least one structural element extending in the transverse direction of the motor vehicle. As a result, different bearing consoles can be attached with different dimensions and designs with respect to the bearing element to the same subframe. Another advantage of such an embodiment is that different materials, such as for example steel, aluminum, or fiber composites, can be combined very easily. In addition, such a solution it is also possible that a modular design of the base frame and subframe can be created with at least two structural elements extending in the longitudinal direction and with a structural element extending in the transverse direction, so that different kinematic designs for the connecting points of the subframe in one chassis will have no influence on the remaining components of the subframe.

When in another advantageous embodiment of the invention at least one bearing console is designed as a pre-assembled component, the final assembly of the entire subframe can be designed so that it is much easier and less expensive.

In order to achieve a connection of the at least one bearing console to the subframe that is very easy to establish as well as to release, it can be additionally also provided that the at least one bearing console is screwed to the at least one structural element extending in the transverse direction of the motor vehicle.

In an alternative embodiment, however, it is provided that the at least one bearing console is materially connected to the at least one structural element extended in the transverse direction of the motor vehicle.

Even greater space savings can be obtained in the area of the subframe when in another advantageous embodiment of the invention, two bearing consoles are attached with a structural element extending in the transverse direction of the motor vehicle to at least a first bearing element and to a second bearing element.

These advantageous space savings can be further increased when two structural elements extending in the transverse direction are provided with the respective bearing consoles.

Other advantageous embodiment and further developments of the invention will become apparent from the remaining dependent claims. An embodiment will now be described with reference to the figures explaining the principle.

DETAILED DESCRIPTION OF THE FIGURES

Figure 1:
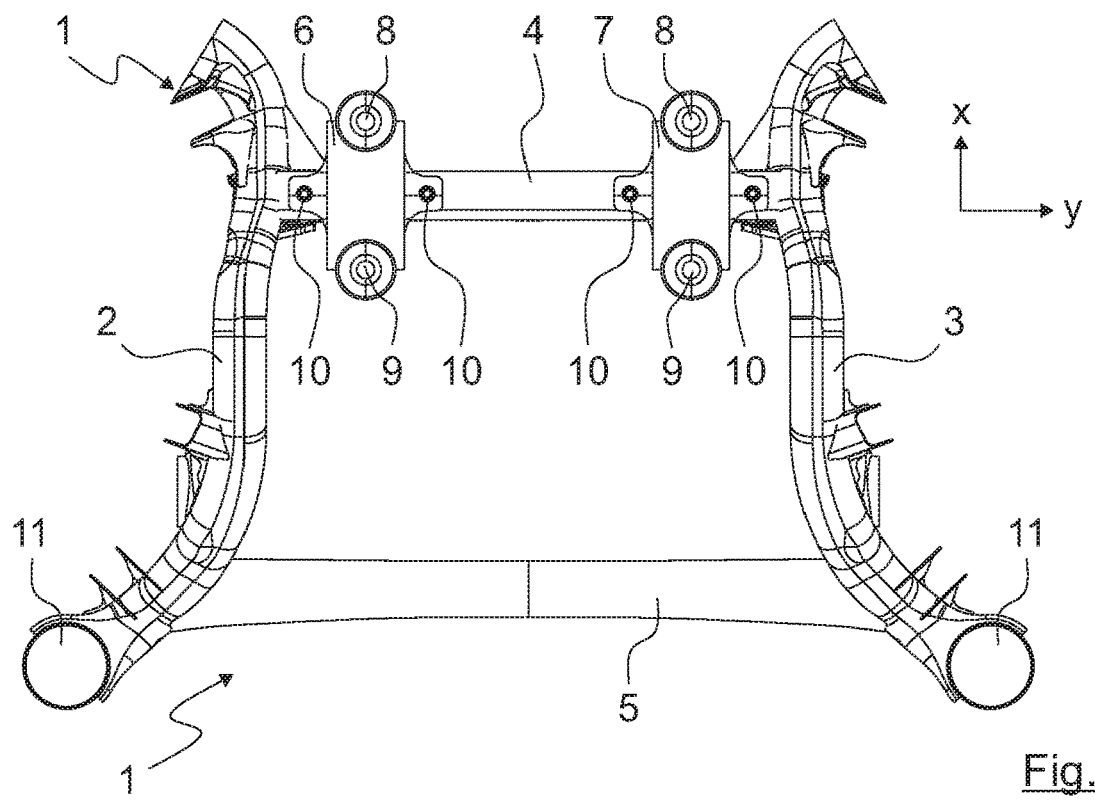
FIG. 1 is a top view of a subframe according to the invention.

FIG. 1 shows a plan view of a subframe according to the invention for a motor vehicle, which is not shown in its entirety. The subframe 1, which is also referred to as an axle carrier and which is located for example in the area of the rear chassis of the motor vehicle, is provided with two structural elements 2 and 3 extending in the longitudinal direction of the motor vehicle designated with the symbol "x", which will hereinafter be referred to as longitudinal carriers 2 and 3 for simplicity. Since the subframe 1 is designed substantially symmetrically with respect to its longitudinal axis, a distinction is not made between both longitudinal carriers 2 and 3.

In addition, the subframe 1 is provided with structural elements 4 and 5 extended in the transverse direction of the motor vehicle indicated with the symbol "y". Since the subframe 1 is not designed symmetrically with respect to the axis in the transverse direction, a distinction is made between both structural elements 4 and 5 extending in the transverse direction, which will hereinafter be referred to as transverse members 4 and 5. In the present case, the rear transverse member is indicated with the reference symbol 4 and the front transverse member is indicated with the reference symbol 5. In principle, it would be also possible for the subframe 1 to be provided with only one of the two structural elements 4 or 5 running in the transverse direction. A larger number of the structural elements 4 or 5 extending in the transverse direction would be also possible.

At least one bearing console is arranged at one of the structural elements 4, 5 extending in the transverse direction, in the present case, two bearing consoles 6 and 7 are arranged in this manner. A different number of the bearing consoles 6 and 7 is also conceivable. At each of both bearing consoles 6 and 7, which are in present example provided with an identical design, are arranged the respective first bearing elements 8, which are used for attachment of the subframe 1 to a chassis of motor vehicle, not shown here, and the respective second bearing elements 9, which are used to connect an assembly, not shown here, to the subframe 1. Both bearing elements 8 and 9 are therefore arranged on a common bearing console 6 or 7, which is in turn attached to the structural element 4, 5 extending in the transverse direction y of the motor vehicle, in the present case to the rear transverse member 4.

The bearing elements 8 or 9 may be of a known construction type and form. For example, these bearings may be hydraulic bearings and/or rubber-metal bearings. The assembly can be for example an electric motor or a battery of a hybrid vehicle or of an electric motor vehicle. However, it can be also provided that a differential gear or the like is supported by means of a second bearing element 9 on the subframe 1. As an option, the bearing consoles 6 and 7 can be also provided with a larger number of bearing elements.

It is preferred when at least one bearing console 6, 7 or both bearing consoles 6 and 7 are detachably attached to the rear transverse member 4. In the embodiment illustrated here, this is achieved so that both bearing consoles 6 and 7 are screwed by means of respective screws 10 to the rear transverse member 4. As an alternative, it would be also possible to connect the at least one bearing console 6, 7 or both bearing consoles 6 and 7 in a materially locking manner to the rear transverse member 4, for example by welding.

Other types of connections are also possible. In addition, the bearing consoles 6 and 8 can be also designed as pre-assembled parts, which is to say that the respective bearing elements 8 and 9 can be already attached to the bearing consoles 6 or 7 before they are connected to the rear transverse member 4.

Figure 5:
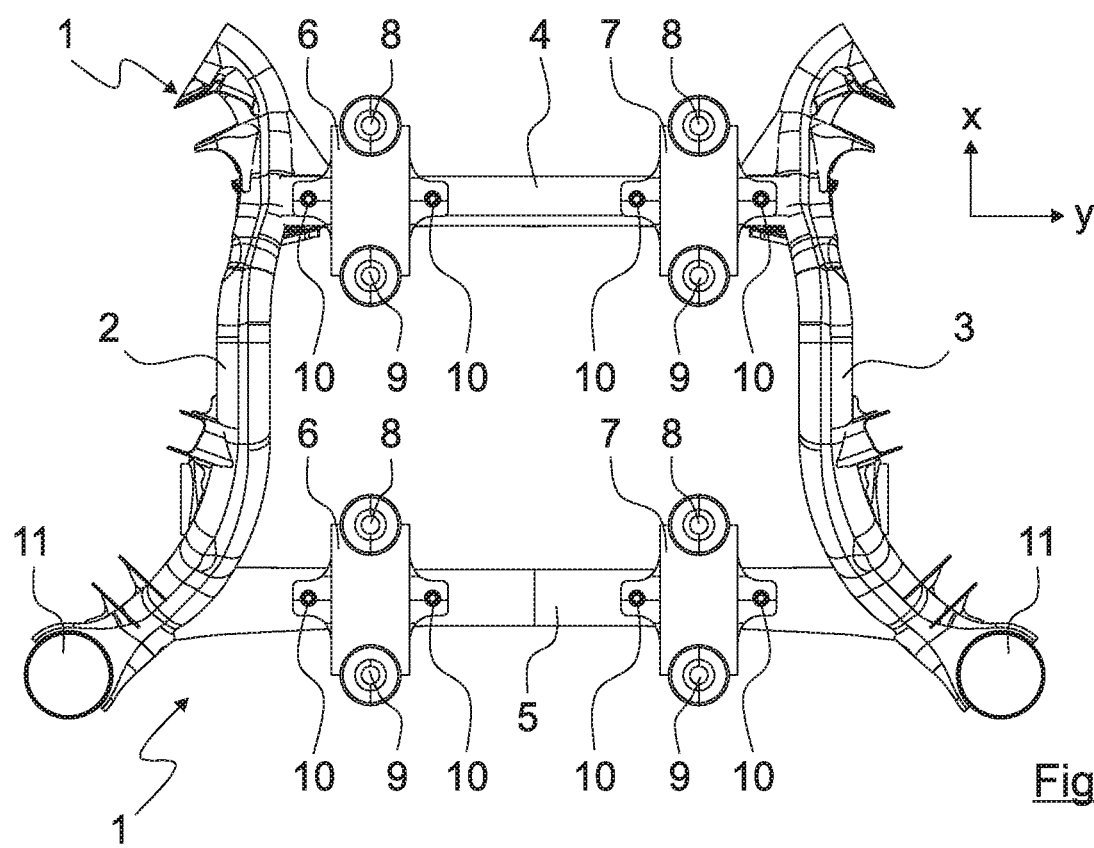
FIG. 5 is another alternative embodiment of the subframe.

In the present case, respective bearing elements 11 are arranged for the support of the subframe 1 on the chassis at the interface of both longitudinal carriers 2 and 3 with the front transverse member 5, of which only the bearing eyes are shown. However, it would be also possible to attach the at least one bearing console 6, 7 or both bearing consoles 6 and 7 with the first and/or second bearing element 8, 9 to the front transverse member 5 and/or 7 both on the rear transverse member 4 and on the front transverse member 5 of the subframe 1. An arrangement of the bearing consoles 6 and/or 7 both on the rear transverse member 4 as well as on the front transverse member 5 is also conceivable, as illustrated in FIG. 5. In this case, a total of four bearing consoles 6 or 7 would then be provided. An even greater number of bearing consoles 6 or 7 would be conceivable also in this case.

Figure 2:
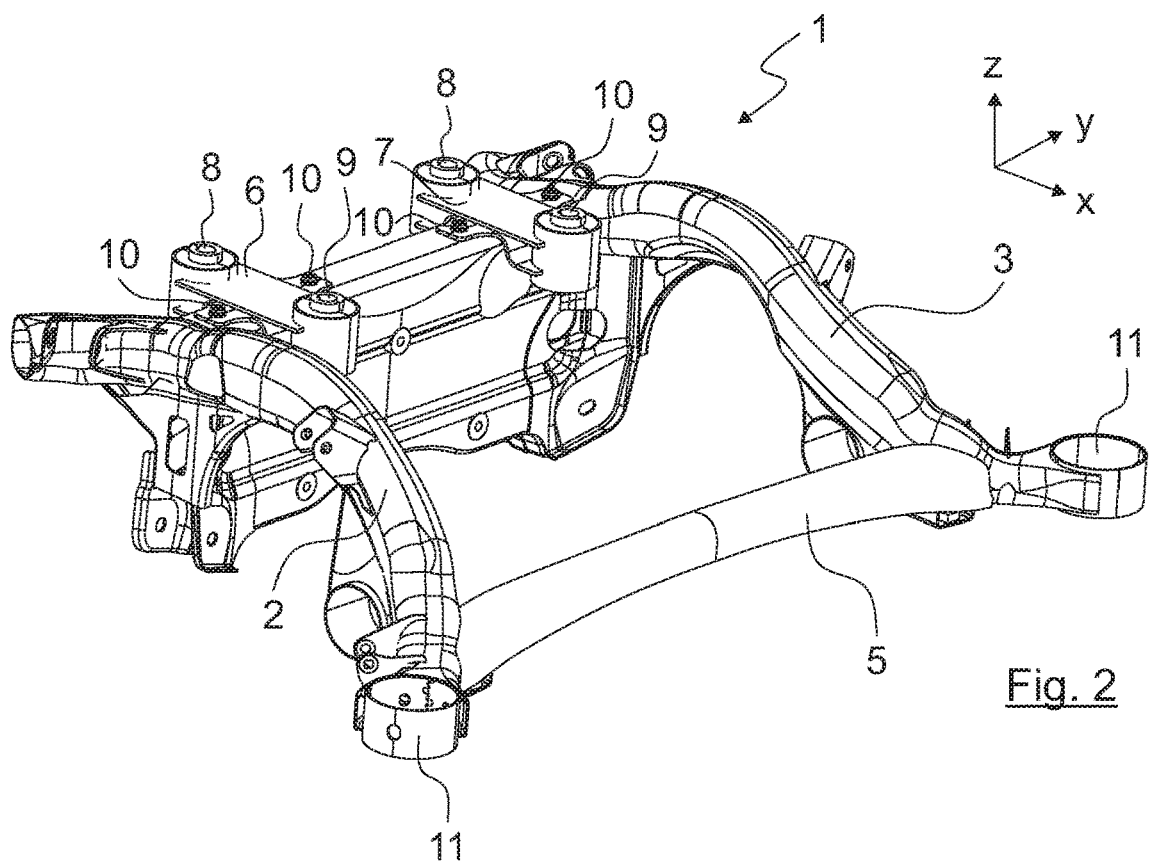
FIG. 2 is a perspective illustration of the subframe of FIG. 1.

In the embodiment of the subframe 1 shown in the FIGS. 1 and 2, both the first bearing elements 8 and the second bearing elements 9 are aligned in the vertical direction indicated by the symbol "z".

Figure 3:
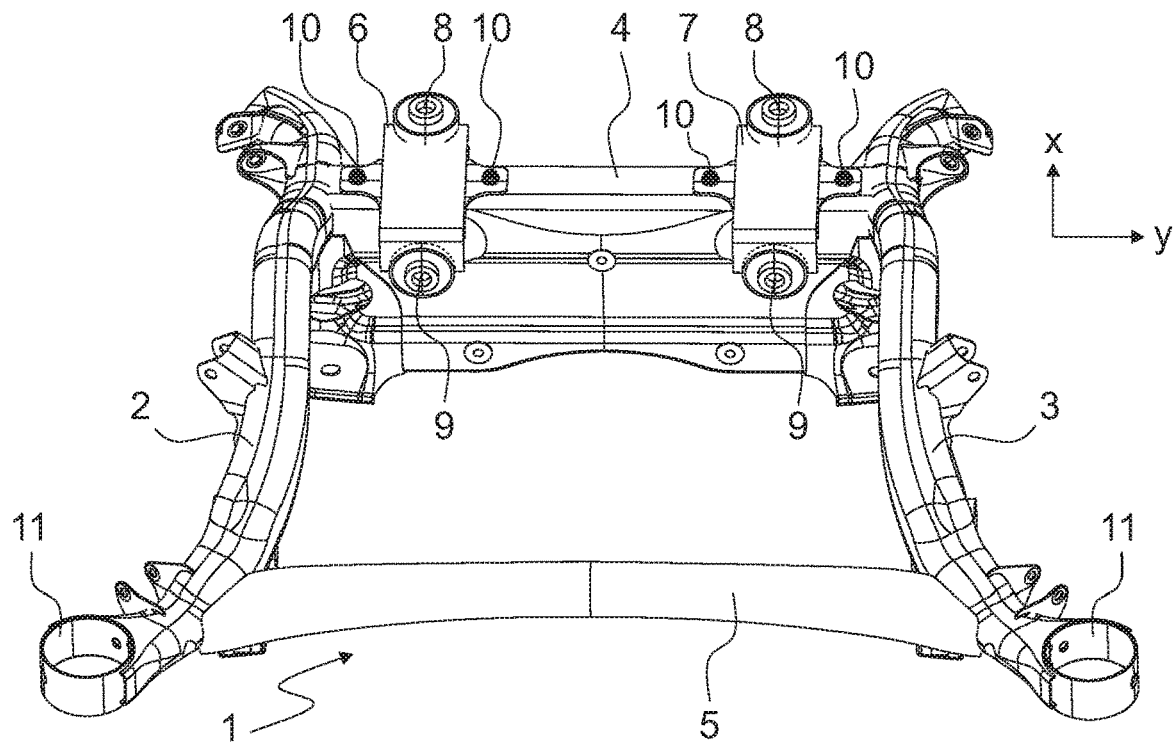
FIG. 3 is an alternative embodiment of the subframe.
Figure 4:
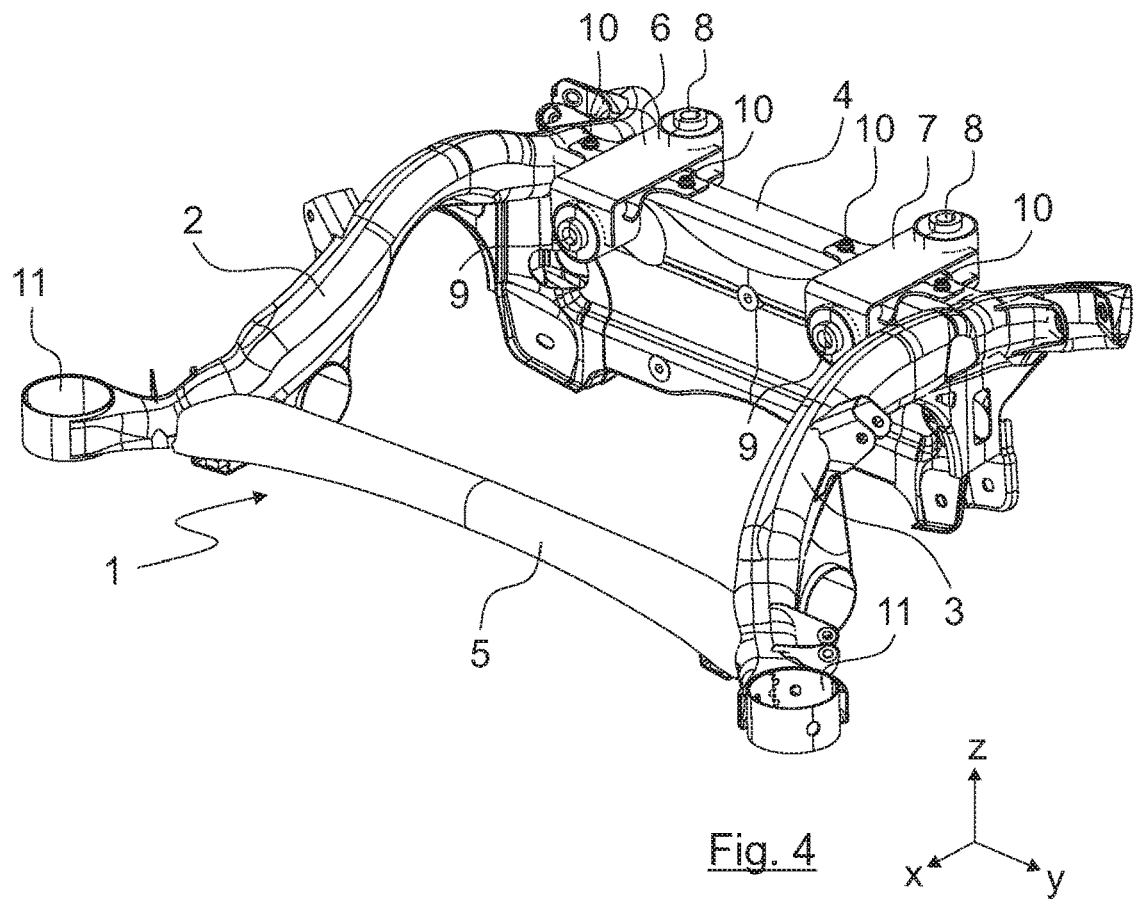
FIG. 4 is another view of the subframe of FIG. 3.

In the embodiment of the subframe 1 that is illustrated in the FIGS. 3 and 4, both first bearing elements 8 are aligned again in the direction indicated by "z". On the other hand, both second bearing elements 9 are aligned in a horizontal direction. In the present case, both second bearing elements 9 are aligned in the direction of the front transverse carrier 5, which is to say in the direction indicated by "x".

However, it would be also possible to align both second bearing elements 9 in the "y" direction.

The arrangement of the first bearing element 8 on the bearing consoles 6 and 7 depends on the relative positioning of the subframe 1 relative to the chassis. On the other hand, the arrangement of the second bearing element 9 on the bearing consoles 6 and 7 depends on the relative position of the assembly mounted by the means of the second bearing element 9, as well as on its mechanical characteristics, for example its behavior during vibration.

The invention claimed is:

1. A subframe for a motor vehicle, comprising;
at least two structural elements extending in the longitudinal direction of the motor vehicle, provided with at least one structural element extending in the transverse direction of the motor vehicle and equipped with a plurality of first bearing elements for connecting the subframe to a chassis of the motor vehicle and with at least two second bearing elements for connecting an assembly at the subframe, wherein at least one of the first bearing elements and at least one of the second bearing elements are arranged at an at least one common bearing console, which is attached to the at least one structural element extending in the transverse direction of the motor vehicle.

2. The subframe according to claim 1, wherein the at least one bearing console is releasably attached to the at least one structural element extending in the transverse direction of the motor vehicle.

3. The subframe according to claim 2, wherein the at least one bearing console is designed as a pre-assembled part.

4. The subframe according to claim 2, wherein the at least one bearing console is screwed to the at least structural element extending in the transverse direction of the motor vehicle.

5. The subframe according to claim 2, wherein the at least one bearing console is connected in a materially locking manner to the at least one structural element extending in the transverse direction of the motor vehicle.

6. The subframe according to claim 1, wherein to the at least one structural element extending in the transverse direction of the motor vehicle are attached two bearing consoles with respective first bearing elements and second bearing elements.

7. The subframe according to claim 1, wherein at least two structural elements extending in the transverse direction of the motor vehicle are provided with respective bearing consoles.

8. The subframe according to claim 1, wherein at least one first bearing element is aligned in a vertical direction.

9. The subframe according to claim 1, wherein at least one second bearing element is aligned in a vertical direction.

10. The subframe according to claim 9, wherein the at least one second bearing element is aligned in a horizontal direction.

* * * * *